United States Patent
Adolf et al.

(10) Patent No.: US 6,267,159 B1
(45) Date of Patent: Jul. 31, 2001

(54) METHOD FOR FILLING THE MEASURING CHAMBER OF A TRANSDUCER MEASURING PRESSURE OR PRESSURE DIFFERENTIAL WITH A PRESSURE TRANSMISSION LIQUID AND A PRESSURE DIFFERENTIAL MEASURING TRANSDUCER

(75) Inventors: Sven Adolf; Hans-Michael Metschke, both of Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/509,694

(22) PCT Filed: Sep. 29, 1998

(86) PCT No.: PCT/DE98/02886

§ 371 Date: Nov. 2, 2000

§ 102(e) Date: Nov. 2, 2000

(87) PCT Pub. No.: WO99/17088

PCT Pub. Date: Apr. 8, 1999

(30) Foreign Application Priority Data

Sep. 30, 1997 (DE) .............................. 197 44 208

(51) Int. Cl.[7] ................................... B65B 1/04
(52) U.S. Cl. ................ 141/95; 141/83; 141/67; 73/715; 29/621.1
(58) Field of Search .................... 141/95, 1, 93, 141/67; 73/715, 700, 716, 719–722; 29/621.1

(56) References Cited

U.S. PATENT DOCUMENTS

| | | | |
|---|---|---|---|
| 4,888,992 | * 12/1989 | Mathias et al. | 73/727 |
| 5,831,170 | * 11/1998 | Sokn | 73/706 |

FOREIGN PATENT DOCUMENTS 2 038 868   2/1971   (DE) .
43 08 718   9/1994   (DE) .

OTHER PUBLICATIONS

Patent Abstracts of Japan, vol. 014, No. 084 (P–1007) Feb. 16, 1990 & JP 01 296122A (Matsushita Electric Ind. Co. Ltd.), Nov. 29, 1989.
Patent Abstracts of Japan, vol. 097, No. 008, Aug. 29, 1997 & JP 09 101222A (Hitachi Ltd.) Apr. 15, 1997.

* cited by examiner

Primary Examiner—Steven O. Douglas
(74) Attorney, Agent, or Firm—BakerBotts LLP

(57) ABSTRACT

A method of filling a measuring chamber of a transducer measuring a pressure or a pressure differential with a pressure transmission fluid through a filling channel is described.

In this method, a filling pin having a longitudinal channel over part of its total length is inserted into the filling channel to the extent that there remains an open connection of the measuring chamber to the outside. After evacuating, the pressure transmission fluid which is under vacuum is introduced into the measuring chamber through the longitudinal channel under the influence of gravity, and then a supplementary amount of pressure transmission fluid is introduced into the measuring chamber by pushing the filling pin beyond the end of its longitudinal channel.

7 Claims, 2 Drawing Sheets

METHOD FOR FILLING THE MEASURING CHAMBER OF A TRANSDUCER MEASURING PRESSURE OR PRESSURE DIFFERENTIAL WITH A PRESSURE TRANSMISSION LIQUID AND A PRESSURE DIFFERENTIAL MEASURING TRANSDUCER

BACKGROUND INFORMATION

German Patent Application No. 43 08 718, for example, describes that each of the two measuring chambers of a transducer measuring a pressure differential is filled through a filling channel after the respective measuring chamber has been evacuated. In filling each measuring chamber with the pressure transmission fluid, it is important to be sure that a defined volume of pressure transmission fluid be introduced into each measuring chamber. Each measuring chamber is gravity-filled with a pressure transmission fluid under vacuum. Then each filling channel is sealed by a sealing device which presses with a sealing ball on a ring lip on the outer end of the filling channel. The sealing ball is secured by a threaded pin.

Unexamined German Patent Application No. 20 38 868 describes another transducer measuring a pressure differential. For filling a measuring chamber with pressure transmission fluid, the pressure transmission fluid is filled into the measuring chamber under vacuum through a channel passing through a stopper after loosening a needle screw. With the help of the stopper, which can change positions due to its screwability and can be secured by a nut, the volume of the measuring chamber and thus the quantity of pressure transmission fluid can be adjusted.

SUMMARY

An object of the present invention is to provide a method of filling a measuring chamber of a transducer measuring a pressure or a pressure differential that can be carried out with a very precisely defined quantity of pressure transmission fluid in each measuring chamber. This object is achieved according to the present invention with a method of filling a measuring chamber of a transducer measuring a pressure or a pressure differential with a pressure transmission fluid through a filling channel, where a filling pin having a longitudinal channel over part of its total length is inserted at first into the filling channel far enough that an open connection of the measuring chamber to the outside remains. After evacuating the measuring chamber, the pressure transmission fluid which is under vacuum is introduced into the measuring chamber through the longitudinal channel and the filling channel under the influence of gravity and then to establish a defined working volume of pressure transmission fluid in the measuring chamber, a supplementary quantity of pressure transmission fluid is fed into the measuring chamber by pushing the filling pin beyond the end of its longitudinal channel.

One advantage of the method according to the present invention is that with it a very precisely metered amount of pressure transmission fluid can be introduced into the respective measuring chamber. This is due to the fact that the filling pin acts in the manner of a piston, so to speak, by "pushing" a precisely defined additional quantity of transmission fluid into the measuring chamber with its pushing action after the pressure transmission fluid has been introduced under gravity. Due to the design of the filling pin with a longitudinal channel and its mounting on the respective transducer in such a manner that there remains an open connection of the measuring chamber with the outside, it is ensured that evacuation and subsequent introduction of pressure transmission fluid under the influence of gravity will not be impaired. Thus, no additional process steps are necessary with the method according to the present invention in an advantageous manner (except for the final pushing of the filling pin) to introduce an additional quantity of pressure transmission fluid to a defined extent after introducing the pressure transmission fluid under the influence of gravity.

In the method according to the present invention, the filling pin can be secured in various ways in the area of the filling channel. However, for reasons pertaining to manufacturing technology and safety engineering, it maybe especially advantageous if the filling pin is secured by a weld after being pushed in.

The filling pin is advantageously pushed in until it is flush with the outer end of the filling channel, because then no reworking of the outside of the filling channel is necessary.

To be able to reliably "resupply" a defined volume of pressure transmission fluid when the filling pin is pushed in, the filling channel is advantageously provided with a sealing lip before introducing the filling pin.

Furthermore, the present invention relates a transducer measuring a pressure or a pressure differential having at least one measuring chamber which can be filled with a pressure transmission fluid through a filling channel and has a sealing device on the outer end of the filling channel. Such a transducer measuring a pressure or a pressure differential is described in, the German patent application described above.

To be able to fill such a transducer measuring a pressure or a pressure differential with a defined quantity of pressure transmission fluid in its measuring chamber or chambers, the sealing device includes according to the present invention filling pin which has a longitudinal channel over part of its total length and is pushed from a position leaving clear an opening to the measuring chamber into the filling channel after filling.

One advantage of the transducer according to the present invention is that it can be manufactured relatively easily with regard to the required filling with pressure transmission fluid and also contains a precisely metered amount of pressure transmission fluid in its measuring chambers.

With the transducer measuring a pressure or a pressure differential according to the present invention, the pin may have different designs of its longitudinal channel. It maybe advantageous if the longitudinal channel of the pin is formed by an outer flattened area on the pin parallel to its axis.

In another embodiment of the pin with regard to its longitudinal channel, the longitudinal channel is formed by a slot in the pin parallel to its axis.

BRIEF DESCRIPTION OF THE DRAWINGS

FIG. 3 shows detail B with the filling pin pushed in.

DETAILED DESCRIPTION

Figure 1:
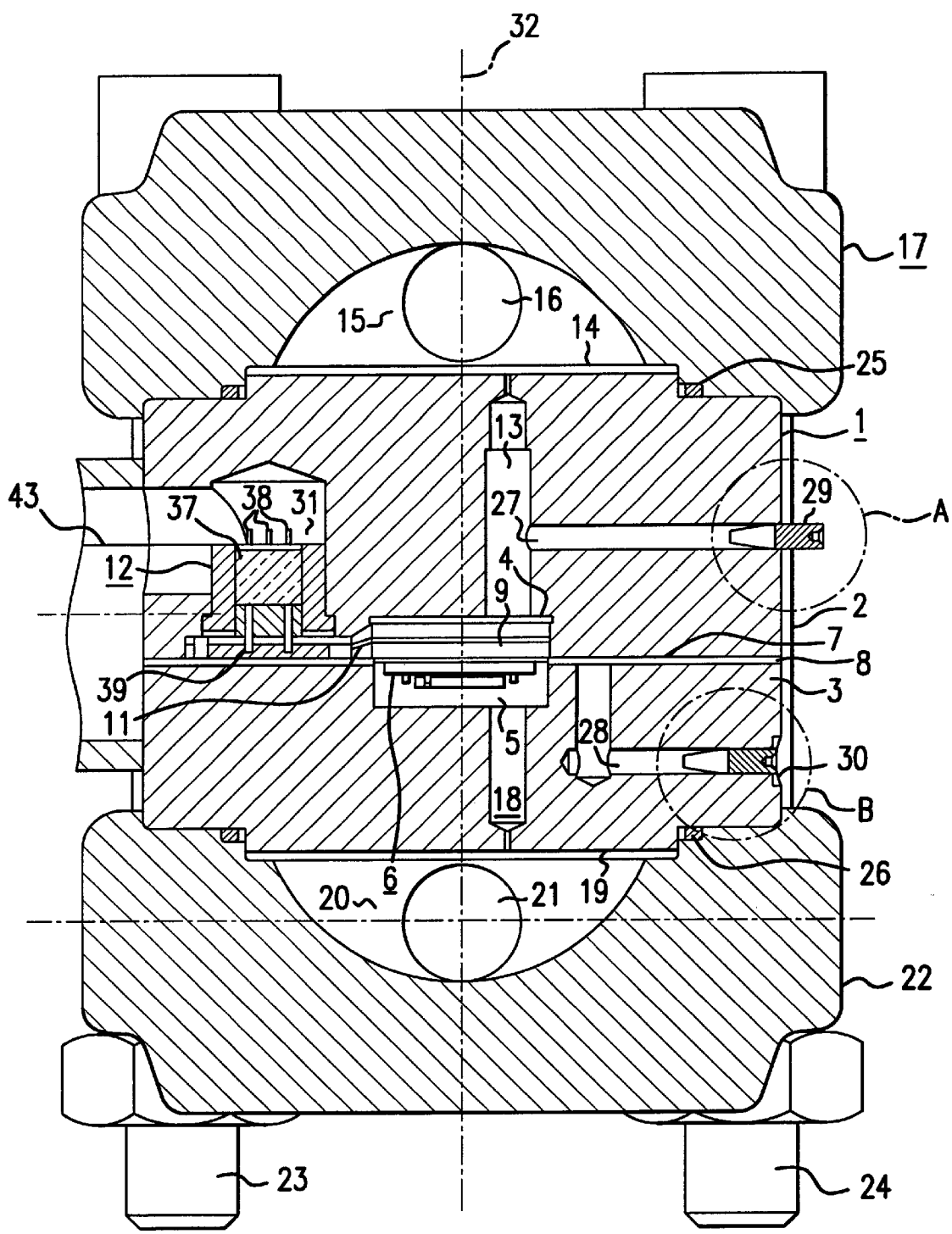
FIG. 1a shows a section through a transducer measuring a pressure differential manufactured by the method according to the present invention.

The transducer measuring a pressure differential illustrated in FIG. 1 has an inside housing 1 having an upper housing part 2 in the figure and another housing part 3 (lower part in the figure). Housing part 2 has a central recess 4; the other housing part 3 also has a central recess 5. A pressure sensor 6 is mounted on a central membrane 7 in the cavity formed by central recesses 4 and 5. Central membrane 7 is secured in a known way by welding between housing parts 2 and 3 of inside housing 1. Pressure sensor 6 is connected at its electric terminals to an electric bushing 12 by a conductor foil strip Central recess 4 of one housing part 2 is connected in a conventional manner to an antechamber 15 via an inner channel 13 to transmit pressure through a dividing membrane 14. Antechamber 15 is formed by a recess in an outer housing cap 17.

Similarly, central recess 5 of other housing part 3 is connected by another inner channel 18 and another dividing membrane 19 to another antechamber 20 in such a way as to transmit pressure. Antechamber 20 is formed by another housing cap 22 which is secured to outer housing cap 17 by setscrews 23 and 24 with O rings 25 and 26 inserted in between.

Within inside channels 13 and 18 of two housing parts 2 and 3 there is a pressure transmission fluid such as oil in a conventional way, added through filling channels 27 and 28 in a known way; these filling channels 27 and 28 are then sealed tightly by filling pins 29 and 30.

As also shown in FIG. 1, one housing part 2 has a bore 31 parallel to longitudinal axis 32 of the transducer measuring a pressure differential. This bore 31 is sealed to the outside with electric bushing 12.

Electric bushing 12 contains electric contact pins 38 embedded in a glass body 37 and projecting on both sides out of electric bushing 12. Therefore, there is the possibility of connecting ends 39 (the lower ends in FIG. 1) of contact pins 38 to conductor foil strip 11. At the upper end in FIG. 1, contact pins 38 are also connected to the printed conductors on another conductor foil strip 43 by soldering.

Figure 4:
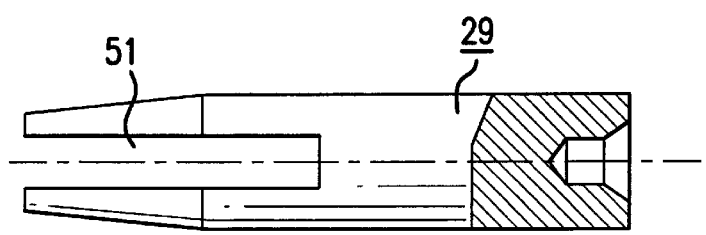
FIG. 4 shows a section through an embodiment of a filling pin which can be used advantageously in the method according to the present invention.

Inside channel 13 of one housing part 2 forms a measuring chamber with one central recess 4 on pressure sensor 6, with the space beneath dividing membrane 14 and a filling channel 27; in the completely assembled state of the transducer measuring a pressure differential as shown here, this measuring chamber is totally filled with pressure transmission fluid. The transducer shown is filled by first inserting filling pin 29 into filling channel 27 (see also FIG. 2) to the extent that a longitudinal channel formed by a slot 51 in filling pin 29 (see FIG. 4) still guarantees an open connection of the measuring chamber to the outside. Then, the measuring chamber is evacuated through this open connection and next it is filled with the pressure transmission fluid; the latter is under vacuum and runs into the measuring chamber under the influence of gravity when joined housing parts 2 and 3 are rotated by 90° relative to the position illustrated here.

Figure 2:
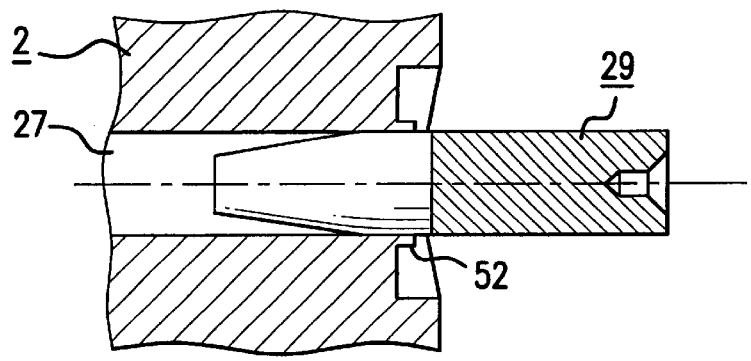
FIG. 2 shows detail A according to FIG. 1 with the pin inserted.
Figure 3:
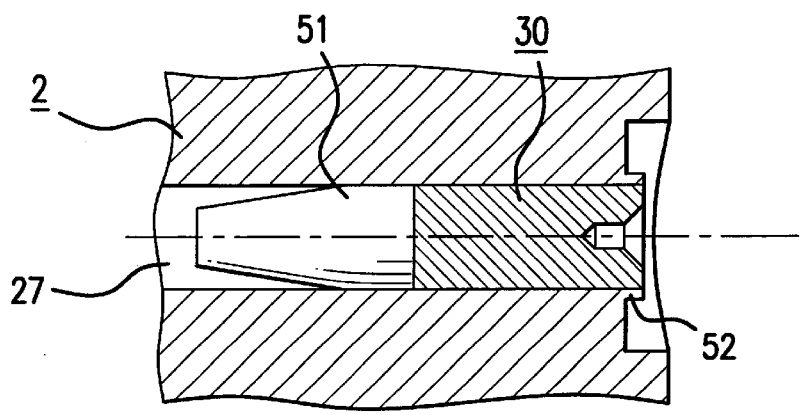

After filling, filling pin 29 is pushed from the position illustrated in detail A and FIG. 2 into housing part 2 or 3 by exerting a piston action, and then it assumes a position like that illustrated as detail B in FIG. 3 on the basis of another filling pin 30. A sealing lip 52 on the outer end of filling channel 27 ensures that no pressure transmission fluid escapes while the pin is being pushed in. Thus, a defined volume of pressure transmission fluid is resupplied because the filling pin has a piston action, so to speak, and a quantity of pressure transmission fluid which is predetermined by the volume pushed in is displaced into the measuring chamber, so the defined quantity of pressure transmission fluid is attained there. Pushed-in filling pin 29 or 30 is arrested in that position by laser beam welding and thus the filling channel is also reliably sealed to the outside.

Figure 5:
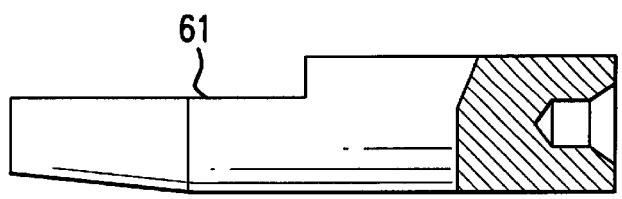
FIG. 5 shows another embodiment of a filling pin.

FIG. 5 shows another embodiment of the filling pin where a longitudinal channel is formed by a flattened area 61 parallel to its axis.

What is claimed is:

1. A method of filling a measuring chamber of a transducer with a pressure transmission fluid through a filling channel, the transducer measuring a pressure or pressure differential with the pressure transmission fluid, the method comprising:

inserting into the filling channel a filling pin having a longitudinal channel over part of a total length of the filling pin, the filling pin being inserted to an extent that an open connection of the measuring chamber to the outside remains;

evacuating the measuring chamber;

after evacuating the measuring chamber, introducing the pressure transmission fluid into the measuring chamber through the longitudinal channel of the filling pin and the filling channel under an influence of gravity, the pressure transmission fluid being under vacuum; and after introducing the pressure transmission fluid, introducing a supplementary amount of pressure transmission fluid into the measuring chamber by pushing the filling pin into the filling channel beyond an outside end of the longitudinal channel of the filling pin to establish a defined working voltage of pressure transmission fluid in the measuring chamber.

2. The method according to claim 1, further comprising:

welding the filling pin after pushing in the filling pin to secure the filling pin.

3. The method according to claim 1, wherein the pushing step includes pushing the filling pin into the filling channel until the filling pin is flush that an outer end of the filling channel.

4. The method according to claim 1, further comprising:

proving the filling channel with a sealing lip before inserting the filling pin.

5. A transducer for measuring a pressure or a pressure differential, comprising:

at least one measuring chamber which can be filled with a pressure transmission fluid through a filling channel; and a sealing device on an outer end of the filling channel, the sealing device including a filling pin having a longitudinal channel over part of a total length of the filling pin, the filling pin being pushed from a position which leaves clear an opening to the measuring chamber into the filling channel after filling.

6. The transducer according to claim 5, wherein the longitudinal channel of the filling pin is formed by an outer flattened area of the filling pin parallel to an axis of the filling pin.

7. The transducer according to claim 5, wherein the longitudinal channel is formed by a slot in the filling pin parallel to an axis of the filling pin.

* * * * *